US005543009A

United States Patent [19]

Hayes

[11] Patent Number: 5,543,009

[45] Date of Patent: Aug. 6, 1996

[54] METHOD OF MANUFACTURING A SIDEWALL ACTUATOR ARRAY FOR AN INK JET PRINTHEAD

[75] Inventor: Donald J. Hayes, Plano, Tex.

[73] Assignee: Compaq Computer Corporation, Houston, Tex.

[21] Appl. No.: 259,518

[22] Filed: Jun. 14, 1994

Related U.S. Application Data

[63] Continuation-in-part of Ser. No. 149,717, Nov. 9, 1993, Pat. No. 5,433,809, which is a continuation of Ser. No. 746,036, Aug. 16, 1991, abandoned.

[51] Int. Cl.$^{6}$ .............................. B32B 31/18; B41J 2/02

[52] U.S. Cl. .......................... 156/268; 156/257; 156/278; 346/139 R; 347/68; 347/71; 347/72

[58] Field of Search ................................ 347/68, 69, 71, 347/72; 310/333; 156/257, 268, 278; 346/139 R

[56] References Cited

U.S. PATENT DOCUMENTS

| | | | |
|---|---|---|---|
| 3,857,049 | 12/1974 | Kyser et al. | 346/1 |
| 3,946,398 | 3/1976 | Zoltan | 310/8.1 |
| 4,536,097 | 8/1985 | Nilsson | 400/126 |
| 4,584,590 | 4/1986 | Fischbeck et al. | 346/140 R |
| 4,825,227 | 4/1989 | Fischbeck et al. | 346/1.1 |
| 4,879,568 | 11/1989 | Bartky et al. | 346/140 R |
| 4,887,100 | 12/1989 | Michaelis et al. | 346/140 R |
| 5,016,028 | 5/1991 | Temple | 346/140 R |
| 5,227,813 | 7/1993 | Pies et al. | 346/140 R |
| 5,235,352 | 8/1993 | Pies et al. | 346/140 R |
| 5,248,998 | 9/1993 | Ochiai et al. | 346/140 R |
| 5,301,404 | 4/1994 | Ochiai et al. | 347/68 X |

FOREIGN PATENT DOCUMENTS

| | | | |
|---|---|---|---|
| 0513971 | 11/1992 | European Pat. Off. . | |
| 6-143588 | 5/1994 | Japan | 347/71 |

*Primary Examiner*—David A. Simmons
*Assistant Examiner*—M. Curtis Mayes
*Attorney, Agent, or Firm*—Vinson & Elkins L.L.P.

[57] ABSTRACT

Method of manufacturing a sidewall actuator array for an ink jet printhead in which a series of longitudinally extending, generally parallel grooves are formed in a body portion of the ink jet printhead. In various embodiments thereof, the body portion may be comprised of a lower body portion formed of an inactive material and an intermediate body portion formed of an active material, a lower body portion formed of active material poled in a first direction and an intermediate body portion formed of active material poled in a second, opposite direction, a lower body portion formed of active material poled in a first direction, a insulative spacing portion and an intermediate body portion formed of active material poled in a second, opposite direction, or a single body portion formed of an active material. After forming grooves therein, a layer of conductive material is deposited on inner side surfaces exposed during the grooving step. If the ink jet printhead is comprised of a single active body portion, the grooves formed in the lower body portion are then deepened to expose second interior side surfaces of the lower body portion. A bottom side surface of an inactive upper body portion is then mounted to the top side surface of the active intermediate body portion to form the sidewall actuator array.

7 Claims, 3 Drawing Sheets

METHOD OF MANUFACTURING A SIDEWALL ACTUATOR ARRAY FOR AN INK JET PRINTHEAD

CROSS REFERENCE TO RELATED APPLICATION

This application is a Continuation-in-Part of U.S. patent application Ser. No. 08/149,717, filed Nov. 9, 1993, now U.S. Pat. No. 5,433,809, entitled "Method of Manufacturing A High Density Ink Jet Printhead Array", which is a Continuation of U.S. patent application Ser. No. 07/746,036, filed Aug. 16, 1991, abandoned, both of which are assigned to the Assignee of the present application and are hereby incorporated by reference as if reproduced in their entirety.

BACKGROUND OF THE INVENTION

1. Field of the Invention

The present invention relates to a method for manufacturing a sidewall actuator array for an ink jet printhead and, more particularly, to a method for manufacturing a sidewall actuator array for an ink jet printhead using a single or double groove forming step orientated in the poling direction for the sidewall actuators.

2. Description of Related Art

Printers provide a means of outputting a permanent record in human readable form. Typically, a printing technique may be categorized as either impact printing or non-impact printing. In impact printing, an image is formed by striking an inked ribbon placed near the surface of the paper. Impact printing techniques may be further characterized as either formed-character printing or matrix printing. In formed-character printing, the element which strikes the ribbon to produce the image consists of a raised mirror image of the desired character. In matrix printing, the character is formed as a series of closely spaced dots which are produced by striking a provided wire or wires against the ribbon. Here, characters are formed as a series of closely spaced dots produced by striking the provided wire or wires against the ribbon. By selectively striking the provided wires, any character representable by a matrix of dots can be produced.

Non-impact printing is often preferred over impact printing in view of its tendency to provide higher printing speeds as well as its better suitability for printing graphics and half-tone images. Non-impact printing techniques include matrix, electrostatic and electrophotographic type printing techniques. In matrix type printing, wires are selectively heated by electrical pulses and the heat thereby generated causes a mark to appear on a sheet of paper, usually specially treated paper. In electrostatic type printing, an electric arc between the printing element and the conductive paper removes an opaque coating on the paper to expose a sublayer of a contrasting color. Finally, in electrophotographic printing, a photoconductive material is selectively charged utilizing a light source such as a laser. A powder toner is attracted to the charged regions and, when placed in contact with a sheet of paper, transfers to the paper's surface. The toner is then subjected to heat which fuses it to the paper.

Another form of non-impact printing is generally classified as ink jet printing. Ink jet printing systems use the ejection of tiny droplets of ink to produce an image. The devices produce highly reproducible and controllable droplets so that a droplet may be printed at a location specified by digitally stored image data. Most ink jet printing systems commercially available may be generally classified as either a "continuous jet" type ink jet printing system where droplets are continuously ejected from the printhead and either directed to or away from the paper depending on the desired image to be produced or as a "drop-on-demand" type ink jet printing system where droplets are ejected from the printhead in response to a specific command related to the image to be produced.

In a continuous jet type ink jet printer, a pump supplies ink to a nozzle assembly where the pumping pressure forces the ink to be ejected therefrom in a continuous stream. The nozzle assembly includes a piezo crystal continuously driven by an electrical voltage, thereby creating pressure disturbances that cause the continuous stream of ink ejected therefrom to break up into uniform droplets of ink. The droplets acquire an electrostatic charge due to the presence of an electrostatic field established close to the ejection orifice. Using high voltage deflection plates, the trajectory of selected ones of the electrostatically charged droplets can be controlled to hit a desired spot on a sheet of paper. The high voltage deflection plates can also deflect unselected ones of the electrostatically charged droplets away from the sheet of paper and into a reservoir for recycling purposes. Due to the small size of the droplets and the precise trajectory control, the quality of continuous jet type ink jet printing systems can approach that of formed-character impact printing systems. However, one drawback to continuous jet type ink jet printing systems is that fluid must be jetting even when little or no printing is required. This requirement degrades the ink and decreases reliability of the printing system.

Due to this drawback, there has been increased interest in those printing systems in which droplets are ejected from the printhead by electromechanically induced pressure waves. In this type of printing system, a volumetric change in the fluid is induced by the application of a voltage pulse to a piezoelectric material which is directly or indirectly coupled to the fluid. This volumetric change causes pressure/velocity transients to occur in the fluid, thereby causing the ejection of a droplet therefrom. Since the voltage is applied only when a droplet is desired, these types of ink jet printing systems are referred to as "drop-on-demand" type ink jet printing systems.

A typical drop-on-demand type ink jet printing system is disclosed in U.S. Pat. No. 3,946,398 to Kyser et al. In Kyser et al., a pressure plate formed from two transversely expandable piezoelectric plates is utilized as the upper wall of an ink-carrying pressure chamber. By applying a voltage across the piezoelectric plates, the pressure plate flexes inwardly into the pressure chamber, thereby causing a fluid displacing volumetric change within the chamber. Another typical drop-on-demand type ink jet printing system may be seen by reference to U.S. Pat. No. 3,857,045 to Zoltan. In Zoltan, a tubular piezoelectric transducer surrounds an ink-carrying channel. When the transducer is excited by the application of an electrical voltage pulse, the ink-carrying channel is compressed and a drop of ink is ejected from the channel. However, the relatively low channel density achieved by such systems as well as the relatively complicated arrangement of the piezoelectric transducer and the associated ink-carrying channel which characterizes such systems causes such systems to be time-consuming and expensive to manufacture.

In order to reduce the per ink-carrying channel (or "jet") manufacturing cost of an ink jet printhead, in particular, those ink jet printheads having a piezoelectric actuator, it has long been desired to produce an ink jet printhead having a channel array in which the individual channels which comprise the array are arranged such that the spacing between adjacent channels is relatively small. For example, it would be very desirable to construct an ink jet printhead having a channel array where adjacent channels are spaced between approximately four and eight mils apart. Such a ink jet printhead is hereby defined as a "high density" ink jet printhead. In addition to a reduction in the per ink-carrying channel manufacturing cost, another advantage which would result from the manufacture of an ink jet printhead with a high channel density would be an increase in printer speed. However, the very close spacing between channels in the proposed high density ink jet printhead has long been a major problem in the manufacture of such printheads.

Many attempts to manufacture ink jet printheads having piezoelectric actuators and reduced spacing between channels have focussed on the manufacture of ink jet printheads with parallel channel arrays and shear mode piezoelectric transducers for actuating the channels. For example, U.S. Pat. Nos. 4,584,590 and 4,825,227, both to Fischbeck et al., disclose shear mode piezoelectric transducers for a parallel channel array ink jet printhead. In both of the Fischbeck et al. patents, a series of open ended parallel ink pressure chambers are covered with a sheet of a piezoelectric material along their roofs. Electrodes are provided on opposite sides of the sheet of piezoelectric material such that positive electrodes are positioned above the vertical walls separating pressure chambers and negative electrodes are positioned over the chamber itself. When an electric field is provided across the electrodes, the piezoelectric material, which is polled in a direction normal to the electric field direction, distorts in a shear mode configuration to compress the ink pressure chamber. In these configurations, however, much of the piezoelectric material is inactive. Furthermore, the extent of deformation of the piezoelectric element tends to be small, thereby minimizing the pressure pulse which may be applied to the ink by the actuator.

An ink jet printhead having a parallel channel array and which utilizes piezoelectric materials to construct the sidewalls of the ink-carrying channels may be seen by reference to U.S. Pat. No. 4,536,097 to Nilsson. In Nilsson, an ink jet channel matrix is formed by a series of strips of a piezoelectric material disposed in spaced parallel relationships and covered on opposite sides by first and second plates. One plate is constructed of a conductive material and forms a shared electrode for all of the strips of piezoelectric material. On the other side of the strips, electrical contacts are used to electrically connect channel defining pairs of the strips of piezoelectric material. When a voltage is applied to the two strips of piezoelectric material which define a channel, the strips become narrower and higher such that the enclosed cross-sectional area of the channel is enlarged and ink is drawn into the channel. When the voltage is removed, the strips return to their original shape, thereby reducing channel volume and ejecting ink therefrom.

An ink jet printhead having a parallel ink-carrying channel array and which utilizes piezoelectric material to form a shear mode actuator for the vertical walls of the channel has also been disclosed. For example, U.S. Pat. Nos. 4,879,568 to Bartky et al. and 4,887,100 to Michaelis et al. each disclose an ink jet printhead channel array in which a piezoelectric material is used as the vertical wall along the entire length of each channel forming the array. In these configurations, the vertical channel walls are constructed of two oppositely polled pieces of piezoelectric material mounted next to each other and sandwiched between top and bottom walls to form the ink channels. Electrodes are formed along the entire height of the vertical channel walls. When an electric field normal to the polling direction of the pieces of piezoelectric material is generated between a pair of electrodes formed on opposite sides of a vertical wall, both of the oppositely poled pieces of piezoelectric material distort in a first direction to compress the ink channel.

The process by which the electrodes are formed in Bartky et al. and Michaelis et al. for the above-referenced piezoelectric sidewall actuator configurations is simplified by the fact that active material is utilized for the entire height of the sidewalls. Where the entire sidewall is not formed of active material or should not have an electrode deposited thereon, Bartky et al., Michaelis et al. and, with even greater particularity, U.S. Pat. No. 5,016,028 to Temple, the recommended process by which electrodes are to be formed along the sidewalls becomes even more complicated. In such configurations, it is recommended that the channel array should be orientated to the electrode depositing, metal vapor beam such that electrode deposition will only take place along part of each sidewall.

It can be readily seen from the foregoing that it would be desirable to provide improved methods for manufacturing sidewall actuator arrays for ink jet printheads which eliminates, or at least substantially reduces, many of the above-mentioned limitations and disadvantages associated with prior methods for manufacturing channel arrays having partially or fully active sidewall actuators. It is, therefore, an object of the present invention to provide such improved methods of manufacturing ink jet printheads.

SUMMARY OF THE INVENTION

In one embodiment, the present invention is of a method of manufacturing, for an ink jet printhead, a sidewall actuator array comprised of a series of sidewall actuators, each having a first part formed from an active material and a second part formed from an inactive material. A lower body portion formed of an inactive material, an intermediate body portion formed of an active material and an upper body portion formed of an inactive material are first provided. The active intermediate body portion includes top and bottom side surfaces and is poled in a first direction generally normal to the top and bottom side surfaces thereof. To construct the sidewall actuator array, the bottom side surface of the active intermediate body portion is mounted to a top side surface of the inactive lower body portion and interior side surfaces of the active intermediate and inactive lower body portions are exposed by forming a series of generally parallel, longitudinally extending grooves which extend through the active intermediate body portion and part of the inactive lower body portion, for example, using a sawing process. A layer of conductive material is deposited on the interior side surfaces of the active intermediate and inactive lower body portions. The bottom side surface of the inactive upper body portion is then insulatively mounted to the top side surface of the active intermediate body portion to form the sidewall actuator array.

In one aspect thereof, the grooves are formed such that they extend into the inactive lower body portion a distance generally equal to the height of the active intermediate body portion. In another aspect thereof, the grooves are formed by removing selected parts of the active intermediate body portion and the inactive lower body portion to form a series of generally parallel, longitudinally extending sidewall actuators, each having an inactive lower wall part having first and second interior side surfaces, an active upper wall part having first and second interior side surfaces and a top side surface. Each of the sidewall actuators formed in this manner are separated from an adjacent sidewall actuator by an interior side surface of the inactive lower body portion which is exposed during the removal of the selected part of the inactive lower body portion. In a further aspect thereof, the layer of conductive material is deposited on the interior surfaces of the active intermediate and inactive lower body portions by metallizing the top side surface of the active upper wall part and the interior side surfaces of the active upper and inactive lower wall parts. The top side surface of the active upper wall part is then demetallized. In yet another aspect thereof, an interior side surface of the lower body portion is also metallized.

In an alternate embodiment thereof, the present invention is of a method of manufacturing, for an ink jet printhead, a sidewall actuator array comprised of a series of sidewall actuators, each having first and second parts formed from respective pieces of active material poled in opposite directions. This method of manufacture differs from the above-described embodiment of the invention in that a lower body portion formed of an active material is provided in place of the inactive material previously utilized. To construct the sidewall actuator array, a bottom side surface of the active intermediate body portion is mounted to a top side surface of the active lower body portion such that the lower body portion is poled in a first direction normal to the top side surface thereof and the intermediate body portion is poled in a second direction normal to the bottom side surface thereof and opposite to the first direction. After completing manufacture in accordance with the above-described method of the invention, a sidewall actuator array comprised of a series of sidewalls, each having an active lower sidewall part poled in a first direction and an active upper sidewall part poled in a second direction opposite to the first direction, is produced.

In a variant of this alternate embodiment of the invention, a block of insulative material is utilized to form a series of spacers for separating the lower and active upper sidewall parts of each sidewall. A bottom side surface of the block of insulative material is mounted to the top side surface of the active lower body portion, which, as before, is poled in a first direction normal to the top side surface thereof. A bottom side surface of the active intermediate body portion is then mounted to a top side surface of the insulative spacing material. A series of generally parallel, longitudinally extending grooves which extend through the intermediate body portion, the spacing material and part of the lower body portion are then formed. After completing manufacture in accordance with the above-described method of the invention, a sidewall actuator array comprised of a series of sidewalls, each comprised of upper and lower active sidewall parts poled in opposite directions and separated by an insulative spacer, is produced.

In another embodiment, the present invention is of a method of manufacturing, for an ink jet printhead, a sidewall actuator array comprised of a series of sidewall actuators. A lower body portion having top and bottom side surfaces thereof and formed of an active piezoelectric material poled in a first direction generally orthogonal to the top and bottom side surfaces is provided. A series of generally parallel, longitudinally extending grooves which extend into the lower body portion a specified distance from the top side surface are then formed. The aforementioned grooves are defined by first interior side surfaces of the lower body portion exposed during the forming step. A layer of conductive material is deposited on the first interior side surfaces of the lower body portion. The grooves formed in the lower body portion are then deepened to expose second interior side surfaces of the lower body portion. A bottom side surface of the inactive upper body portion is then mounted to the top side surface of the active intermediate body portion to form the sidewall actuator array. In one aspect thereof, the layer of conductive material is deposited on the interior side surface of the lower body portion by depositing a layer of conductive material on the top and interior side surfaces of the upper wall parts followed by removing the portion of the layer of conductive material which was deposited on the top side surfaces of the upper wall part.

BRIEF DESCRIPTION OF THE DRAWING

The present invention may be better understood, and its numerous objects, features and advantages will become apparent to those skilled in the art by reference to the accompanying drawing, in which.

DETAILED DESCRIPTION

Figure 1A:
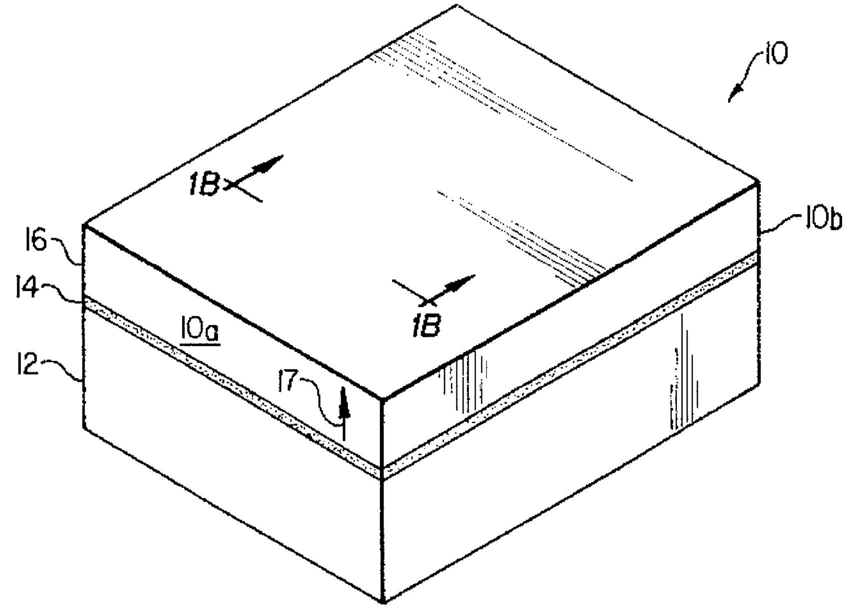
FIG. 1A is a perspective view of a block of piezoelectric material suitable for use in manufacturing a sidewall actuator array for an ink jet printhead in accordance with the teachings of the present invention.

Referring now to FIGS. 1A through 1F, a first method of constructing a sidewall actuator array 38 for an ink jet printhead in accordance with the teachings of the present invention will now be described in greater detail. More specifically, in FIG. 1A, a generally rectangular block 10 of piezoelectric material may now be seen. The block 10 includes a inactive lower body portion 12 formed of an unpoled piezoelectric material or other inactive material such as ceramic, insulatively mounted by a layer of adhesive 14 to an active intermediate body portion 16 formed of an active piezoelectric material poled in the direction of arrow 17. Preferably, the active intermediate body portion 16 is formed using lead zirconate titante (or "PZT"). It should be clearly understood, however, that other active piezoelectric material would be suitable for use herein without departing from the scope of the invention. The exact length, width and height of the inactive lower body portion 12 and the active intermediate body portion 16 will vary depending upon the size of the sidewall actuator array to be manufactured. It is contemplated, however, that the inactive lower body portion 12 and the active intermediate body portion 16 should have similar lengths and widths and that the inactive lower body portion 12 should be at least twice as thick as the active intermediate body portion 16.

Figure 1B:
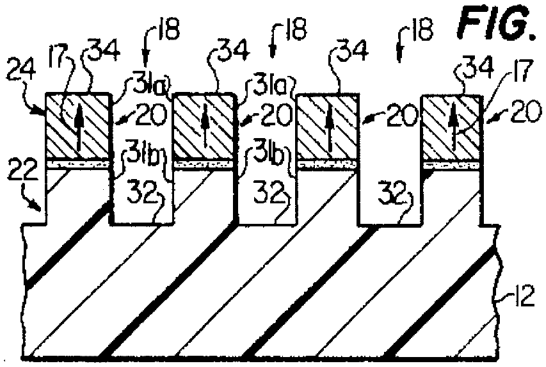
FIG. 1B is an enlarged partial cross-sectional view taken along line 1B—1B of FIG. 1A after a forming step has formed a series of grooves therein.

Referring next to FIG. 1B, a material removal process is then utilized to form a series of longitudinally extending, substantially parallel grooves 18 in the block 10. The grooves 18 are defined by side surfaces 31*a*, 31*b* and bottom surface 32, all of which were exposed during the material removal process. Each groove 18 extends through the active intermediate body portion 16 and part of the inactive lower body portion 12 and is separated from an adjacent groove 18 by a longitudinally extending sidewall 20 produced during the formation of the grooves 18 and having a top side surface 34. Each sidewall 20 is comprised of an inactive lower wall part 22 integrally formed with and originally part of the lower body portion 12 and an active upper wall part 24 originally part of the intermediate body portion 14. While the extent to which the grooves 18 may extend into the lower body portion 12 may be varied without departing from the scope of the present invention, it is contemplated that the grooves 18 should be formed such that extend into the lower body portion 12 a distance generally equal to the thickness of the intermediate body portion 16. Grooves 18 may be formed using any of the various machining techniques presently available. For example, a highly precision sawing process would be suitable for forming the grooves 18. Furthermore, while not visible in FIG. 1B, it should be clearly understood that the grooves 18 extend from a front end surface 10*a* to a back end surface 10*b* of the block 10.

Figure 1C:
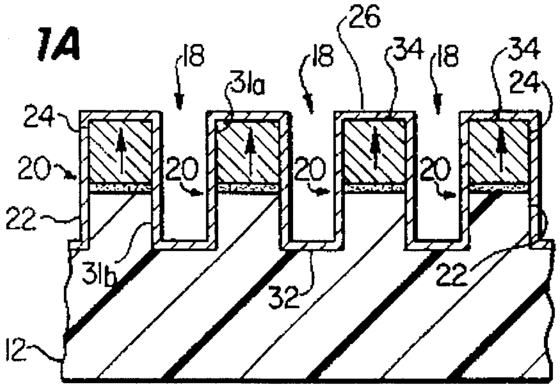
FIG. 1C is an enlarged partial cross-sectional view of the grooved block of FIG. 1B after a metallization step.

Referring next to FIG. 1C, a layer 26 of conductive material is formed on the top and interior side surfaces 34, 31*a* of the upper wall parts 24, the interior side surfaces 31*b* of the lower wall parts 22 and the bottom side surfaces 32 located between the lower wall parts 22. Preferably, the step of forming the conductive layer 26 on the side surfaces 34, 31*a*, 31*b*, 32 would be accomplished by depositing a layer of a nichrome-gold alloy on each of the interior side surfaces 31*a*, 31*b*, 32 and the top side surfaces 34. It should be clearly understood, however, that the aforementioned deposition process is but one manner in which a layer of conductive material may be applied to the surfaces 31*a*, 31*b*, 32, 34 and that numerous other deposition techniques and conductive materials would be suitable to form the layer of conductive material.

Figure 1D:
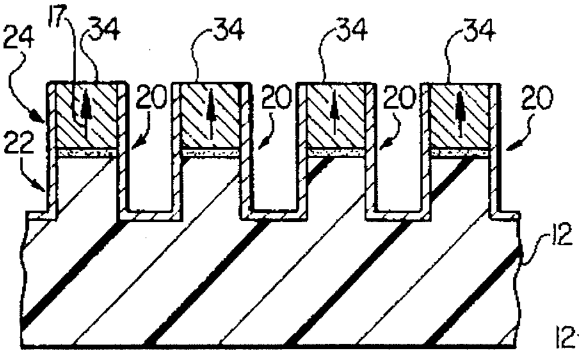
FIG. 1D is an enlarged partial cross-sectional view of the metallized grooved block of FIG. 1C after a partial demetallization step.

Referring next to FIG. 1D, that portion of the layer 26 of conductive material formed on the top side surfaces 34 of the top wall parts 24 are removed by a conventional demetallization process, for example, using an etching process, after protecting that portion of the layer 26 of conductive material formed on the interior side surfaces 31*a*, 31*b*, 32, for example, by masking the aforementioned side surfaces.

Figure 1E:
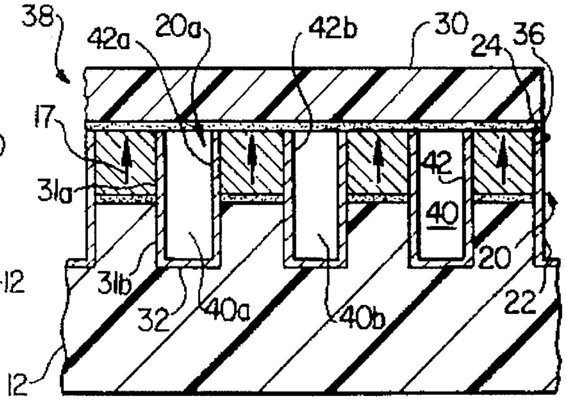
FIG. 1E is an enlarged partial cross-sectional view of the partially demetallized grooved block of FIG. 1D after a cover has been mounted thereto to complete assembly of a sidewall actuator array for an ink jet printhead.

Referring next to FIG. 1E, a top body portion 30 formed of an inactive material is mounted to the top side surfaces 34 of the top wall parts 24 by a layer 36 of a non-conductive adhesive material. As may now be seen in FIG. 1E, as well as FIG. 1F, a sidewall actuator array 38 has now been fully assembled. The sidewall actuator array 38 is comprised of a series of generally parallel, longitudinally extending channels 40, each of which is defined by a first sidewall actuator 20 (comprised of an inactive lower wall part 22 having an inner side surface 31*b* and an active upper wall part 24 having an inner side surface 31*a*), a second sidewall actuator 20 (again comprised of an inactive lower wall part 22 having an inner side surface 31*b* and an active upper wall part 24 having an inner side surface 31*a*), a portion of the inactive top body portion 30 separating the first and second sidewall actuators 20 and a portion of the inactive lower body portion 12 having a bottom side surface 32 separating the first and second sidewall actuators 20.

To electrically connect the sidewall actuator array 38, each portion 42 of the conductive layer 26 formed along the inner side surfaces 31*a*, 31*b* and bottom side surface 32 defining one of the channels 40 is used as an individual contact to be electrically connected to a drive system (not shown) capable of selectively applying a positive or negative voltage to the portion 42. When a positive voltage is applied to a first contact 42*a* and a negative voltage is applied to a second contact 42*b*, an electric field E normal to the poling direction P is produced across the sidewall actuator 20*a*, thereby causing the sidewall actuator 20*a* to deflect into the ink-carrying channel 40*b*, thereby imparting a positive pressure pulse into a first ink-carrying channel 40*b* partially defined thereby and a negative pressure pulse into a second ink-carrying channel 40*a* partially defined thereby. By proper application of positive and/or negative pressure pulses to the ink-carrying channels 40, a droplet of ink may be ejected from a front end of the channels.

Figure 1F:
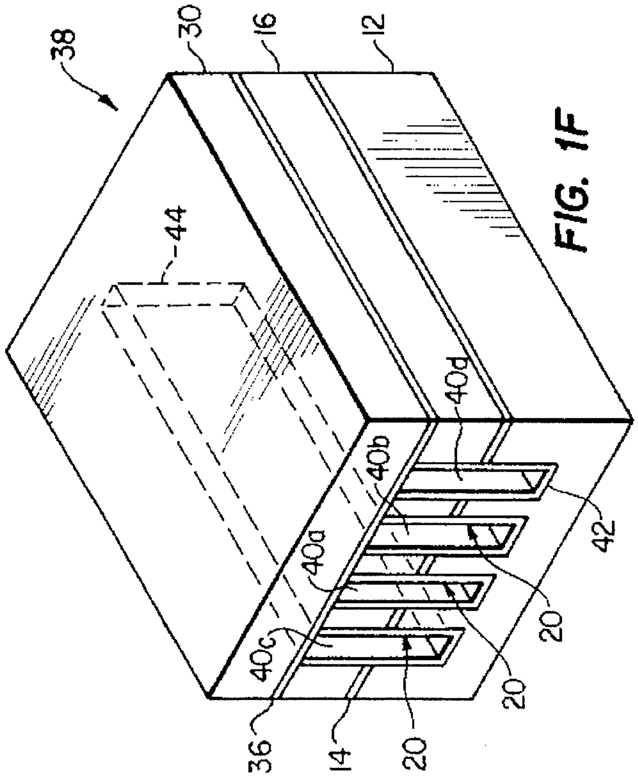
FIG. 1F is a perspective view of the fully assembled sidewall actuator array for an ink jet printhead of FIG. 1E.

It should be clearly noted, however, that the number of channels included sidewall actuator array 38 illustrated in FIG. 1F is purely exemplary and that it is fully contemplated that the sidewall actuator array 38 may include any number of channels. Furthermore, it is recommended that the outermost channel on each side of the sidewall actuator array 38, designated in FIG. 1F as channels 40*c* and 40*d*, respectively, should remain inactive. Finally, to complete assembly of an ink jet printhead from the illustrated sidewall actuator array 38, back ends 44 of the channels 40 should be closed and means (not shown) for supplying ink to the channels 40 should be provided.

Figure 1G:
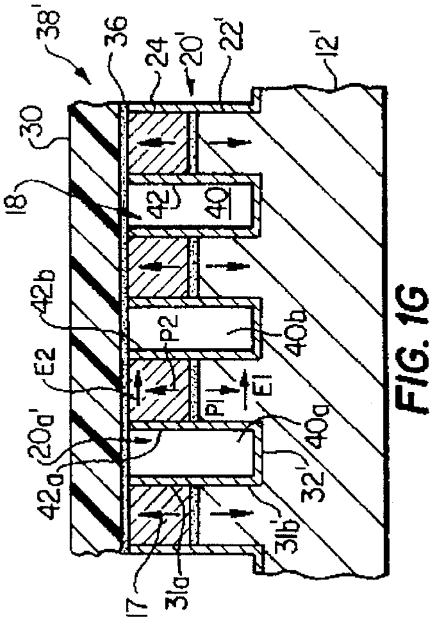
FIG. 1G is an enlarged partial cross-sectional view of an alternate configuration of the sidewall actuator array for an ink jet printhead of FIG. 1E in which an active lower body portion has been substituted for the inactive lower body portion prior to the formation of a series of grooves therein.
Figure 2G:
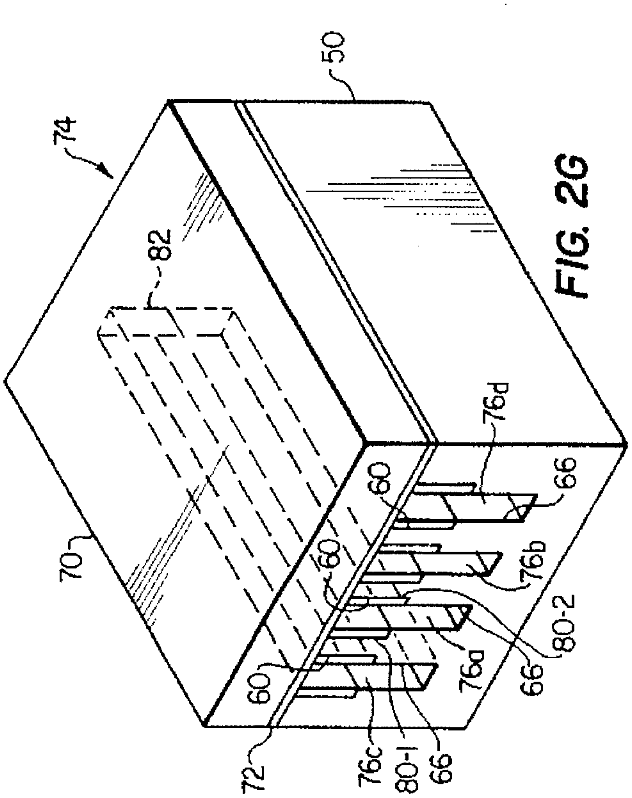
FIG. 2G is a perspective view of the fully assembled sidewall actuator array for an ink jet printhead of FIG. 2F.

Referring next to FIG. 1G, an alternate configuration of the sidewall actuator array 38 of FIG. 1E will now be described in greater detail. In this embodiment of the invention, sidewall actuator 38' includes a lower body portion 12' formed of an active piezoelectric material poled in a direction opposite to that of the intermediate body portion 14. To construct the sidewall actuator array 38', the active lower body portion 12' is provided in place of the inactive lower body portion 12 when forming the block 10. Apart from this substitution of material, the construction of the sidewall actuator array 38' is identical to the technique already described with respect to FIGS. 1A–1F. Thus, as before, a layer 14 of adhesive is used to insulatively mount the active intermediate body portion 16 to the active lower body portion 12'. The active lower body portion 12' is poled in direction P1 and the active intermediate body portion 16 is poled in direction P2. The series of longitudinally extending, substantially parallel grooves 18 defined by the side surfaces 31*a*, 31*b* and bottom surface 32 are then formed. In this embodiment, however, each groove 18 extends through the active intermediate body portion 16 and part of the active lower body portion 12' and is separated from an adjacent groove 18 by a longitudinally extending sidewall 20' produced during the formation of the grooves 18. Each sidewall 20' thusly formed is comprised of an active lower wall part 22' integrally formed with and originally part of the active lower body portion 12' and an active upper wall part 24 originally part of the intermediate body portion 14.

After completing construction in the afore-described manner, the sidewall actuator array 38' thusly constructed is comprised of a series of generally parallel, longitudinally extending channels 40, each of which is defined by a first sidewall actuator 20' (comprised of an active lower wall part 22' having an inner side surface 31*b*' and an active upper wall part 24 having an inner side surface 31*a*), a second sidewall actuator 20' (again comprised of an active lower wall part 22' having an inner side surface 31*b*' and an active upper wall part 24 having an inner side surface 31*a*), a portion of the inactive top body portion 30 separating the first and second sidewall actuators 20' and a portion of the active lower body portion 12' having a bottom side surface 32' separating the first and second sidewall actuators 20'.

Once the sidewall actuator array 38' is electrically connected in the manner previously described, each portion 42 of the conductive layer 26 formed along the inner side surfaces 31*a*, 31*b*' and bottom side surface 32' defining one of the channels 40 is used as an individual contact to be electrically connected to a drive system (not shown) capable of selectively applying a positive or negative voltage to the portion 42. When a positive voltage is applied to a first contact 42*a* and a negative voltage is applied to a second contact 42*b*, electric fields E1 and E2, each of which is normal to the poling direction P1 and P2, respectively, of the sidewall actuator parts 22' and 24. The application of the electric field E1 causes the sidewall actuator part 22' to deflect into the ink-carrying channel 40*b* and the application of the electric field E2 causes the sidewall actuator part 24 to also deflect into the ink-carrying channel 40*b*, thereby imparting a positive pressure pulse into a first ink-carrying channel 40*b* partially defined thereby and a negative pressure pulse into a second ink-carrying channel 40*a* partially defined thereby. By proper application of positive and/or negative pressure pulses to the ink-carrying channels 40, a droplet of ink may be ejected from a front end of the channels.

Figure 1H:
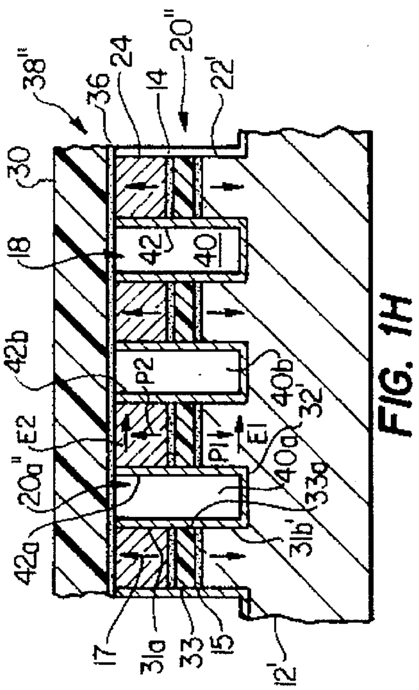
FIG. 1H is an enlarged partial cross-sectional view of a variant of the sidewall actuator array for an ink jet printhead of FIG. 1G in which an insulative spacer is mounted to the active lower body portion prior to the mounting of the active intermediate body portion thereto.

Referring next to FIG. 1H, a variant of the sidewall actuator array 38' of FIG. 1G will now be described in greater detail. In this embodiment of the invention, sidewall actuator 38" again includes a lower body portion 12' formed of an active piezoelectric material poled in a direction opposite to that of the intermediate body portion 16. In this embodiment, however, an insulative spacer portion 33 separates the two. To construct the sidewall actuator array 38" the active lower body portion 12' is again provided in place of the inactive lower body portion 12 when forming the block 10. A layer 15 (that portion of which remains after the material removal step being visible in FIG. 1H) of adhesive 15 is then used to insulatively mount a bottom side surface of a block of insulative material to a top side surface of the active lower body portion 12'. Next, a layer 14 (again, that portion of which remains after the material removal step being visible in FIG. 1H) of adhesive is used to insulatively mount a bottom side surface of the active intermediate body portion 16 to a top side surface of the block of insulative material. The series of longitudinally extending, substantially parallel grooves 18 defined by the side surfaces 31*a*, 33*a*, 31*b*' and bottom surface 32' are then formed. In this embodiment, however, each groove 18 extends through the active intermediate body portion 16, the block of insulative material and part of the active lower body portion 12' and is separated from an adjacent groove 18 by a longitudinally extending sidewall 20" produced during the formation of the grooves 18. Each sidewall 20" thusly formed is comprised of an active lower wall part 22' integrally formed with and originally part of the active lower body portion 12' an insulative spacer portion 33 and an active upper wall part 24 originally part of the intermediate body portion 16.

After completing construction of the sidewall actuator array 38" in the afore-described manner, the sidewall actuator array 38" thusly constructed is comprised of a series of generally parallel, longitudinally extending channels 40, each of which is defined by a first sidewall actuator 20" (comprised of an active lower wall part 22' having an inner side surface 31*b*' an insulative spacer part 33 having an inner side surface 33*a* and an active upper wall part 24 having an inner side surface 31*a*), a second sidewall actuator 20" (again comprised of an active lower wall part 22' having an inner side surface 31*b*' an insulative spacer part 33 having an inner side surface 33*a* and an active upper wall part 24 having an inner side surface 31*a*), a portion of the inactive top body portion 30 separating the first and second sidewall actuators 20" and a portion of the active lower body portion 12' having a bottom side surface 32' separating the first and second sidewall actuators 20".

Once the sidewall actuator array 38" is electrically connected in the manner previously described, each portion 42 of the conductive layer 26 formed along the inner side surfaces 31*a*, 33*a*, 31*b*' and bottom side surface 32' defining one of the channels 40 is used as an individual contact to be electrically connected to a drive system (not shown) capable of selectively applying a positive or negative voltage to the portion 42. When a positive voltage is applied to a first contact 42*a* and a negative voltage is applied to a second contact 42*b*, electric fields E1 and E2, each of which is normal to the poling direction P1 and P2, respectively, of the sidewall actuator parts 22' and 24. The application of the electric field E1 causes the sidewall actuator part 22' to deflect into the ink-carrying channel 40*b* and the application of the electric field E2 causes the sidewall actuator part 24 to also deflect into the ink-carrying channel 40*b*, thereby imparting a positive pressure pulse into a first ink-carrying channel 40*b* partially defined thereby and a negative pressure pulse into a second ink-carrying channel 40*a* partially defined thereby. By proper application of positive and/or negative pressure pulses to the ink-carrying channels 40, a droplet of ink may be ejected from a front end of the channels.

Referring next to FIGS. 2A through 2G, a second method of constructing a sidewall actuator array for an ink jet printhead in accordance with the teachings of the present invention will now be described in greater detail. More specifically, in FIG. 2A, a generally rectangular block 50 of piezoelectric material, preferably PZT, poled in the direction of arrow 52 may now be seen.

Figure 2A:
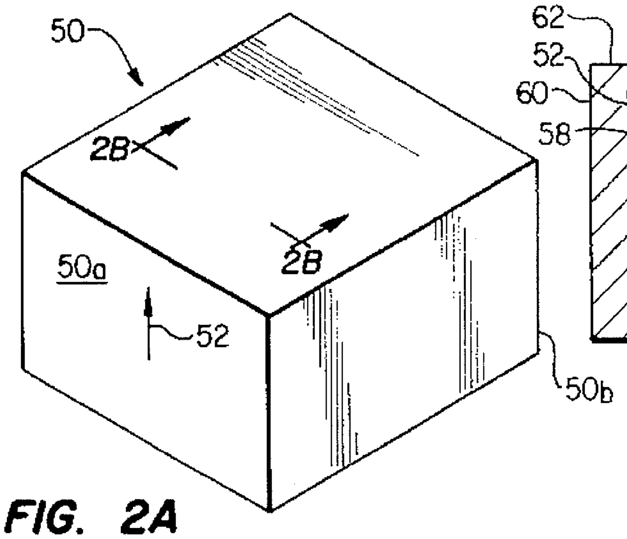
FIG. 2A is a perspective view of a block of poled piezoelectric material suitable for use in manufacturing a sidewall actuator array for an ink jet printhead in accordance with the teachings of the present invention.
Figure 2B:
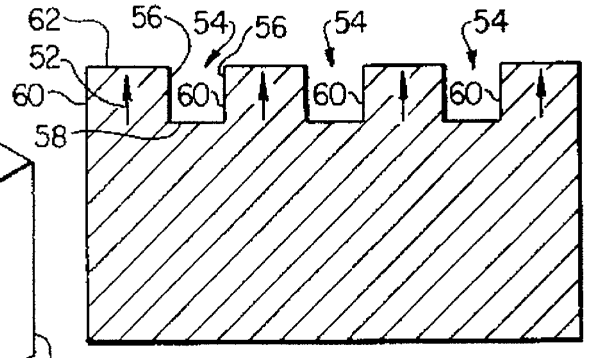
FIG. 2B is an enlarged partial cross-sectional view taken along line 2B—2B of FIG. 2A after a first forming step has formed a series of grooves therein.

Referring next to FIG. 2B, a material removal process is then utilized to form a series of longitudinally extending, substantially parallel grooves 54 which extend partway through the block 50 of poled piezoelectric material. Each of the grooves 54 are separated by an upper wall part 60 from an adjacent groove 54. Each upper wall part 60 includes a top side surface 62 and each groove 54 is defined by side and bottom interior side surfaces 56 and 58 of the upper wall part 60 exposed during the material removal process. Grooves 54 may be formed using any of the various machining techniques presently available. For example, a highly precision sawing process would be suitable for forming the grooves 54. Furthermore, while not visible in FIG. 2B, it should be clearly understood that the grooves 54 extend from a front end surface 50*a* to a back end surface 50*b* of the block 50.

Figure 2C:
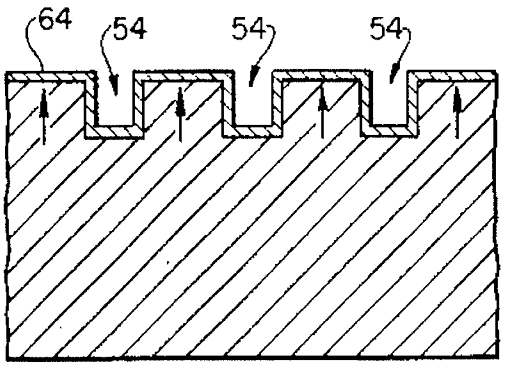
FIG. 2C is an enlarged partial cross-sectional view of the grooved block of FIG. 2B after a metallization step.

Referring next to FIG. 2C, a layer 64 of conductive material is formed on the top, interior and bottom side surfaces 62, 56, 58 of the upper wall parts 60. Preferably, the step of forming the conductive layer 64 on the side surfaces 62, 56, 58 would be accomplished by depositing a layer of a nichrome-gold alloy on each of the interior side surfaces 56, 58 and the top side surfaces 62. It should be clearly understood, however, that the aforementioned deposition process is but one manner in which a layer of conductive material may be applied to the side surfaces 62, 56, 58 and that numerous other deposition techniques and conductive materials would be suitable to form the layer 64 of conductive material.

Figure 2D:
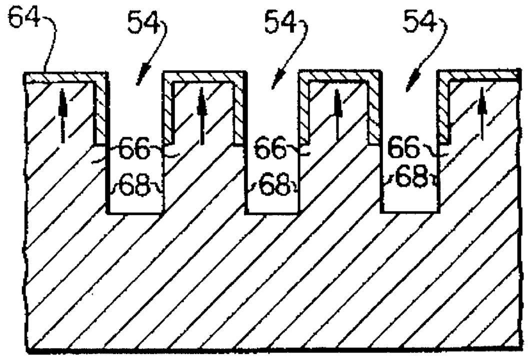
FIG. 2D is an enlarged partial cross-sectional view of the metallized grooved block of FIG. 2C after a second forming step has deepened the previously formed series of grooves.

Referring next to FIG. 2D, a second material removal step is then performed to extend the grooves 54 downwardly. As before, the grooves 54 may be extended using a high precision sawing process. It should be noted, however, that in the second material removal step, the extension of the grooves 54 should be formed slightly narrower than the width of the grooves 54 formed during the first material removal step, thereby preventing the removal of that portion of the layer 64 of conductive material deposited on the side surfaces 56 while removing that portion of the layer 64 deposited on the side surface 58. Preferably, the grooves 54 should be extended such that lower wall parts 66 having interior side surfaces 68 and a height approximately equal to that of the upper wall parts 60 are formed. It should be clearly understood, however, that the height of the lower wall parts 66, relative to the height of the upper wall parts 60 may be varied dramatically without departing from the scope of the invention.

Figure 2E:
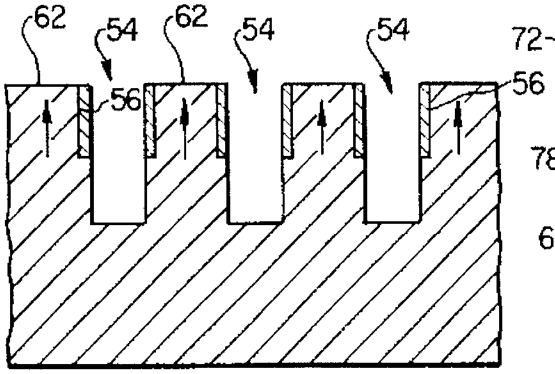
FIG. 2E is an enlarged partial cross-sectional view of the metallized grooved block of FIG. 2D after a partial demetallization step.
Figure 2F:
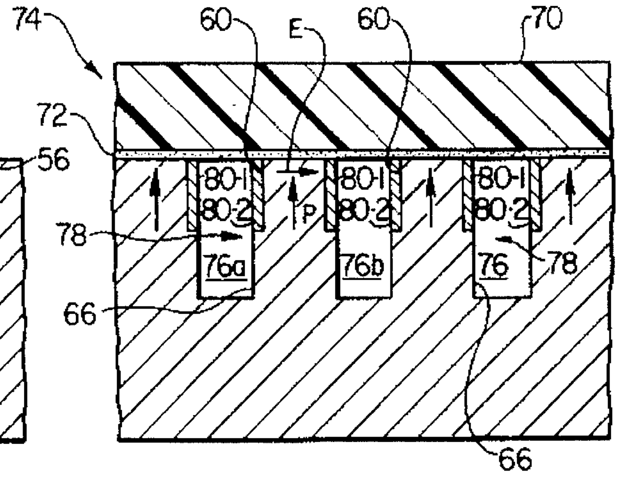
FIG. 2F is an enlarged partial cross-sectional view of the partially demetallized grooved block of FIG. 2E after a cover has been mounted thereto to complete assembly of a sidewall actuator array for an ink jet printhead.

Referring next to FIG. 2E, that portion of the layer 64 of conductive material formed on the top side surfaces 62 of the upper wall parts 58 are removed by a conventional demetallization process, for example, using an etching process after masking that portion of the layer 64 of conductive material deposited on the side surfaces 56. Finally, as illustrated in FIG. 2F, a top body portion 70 formed of an inactive material is mounted to the top side surfaces 62 of the upper wall parts 60 by a layer 72 of a non-conductive adhesive material. As may now be seen in FIG. 2F, as well as FIG. 2G, a sidewall actuator array 74 has now been fully assembled. The sidewall actuator array 74 is comprised of a series of generally parallel, longitudinally extending channels 76, each of which is defined by a first sidewall actuator 78 (comprised of an inactive lower wall part 66 and an active upper wall part 60), a second sidewall actuator 78 (again comprised of an inactive lower wall part 66 and an active upper wall part 60), a portion of the inactive top body portion 70 separating the first and second sidewall actuators 78 and a portion of the unsawed block 50 of active piezoelectric material which separates the first and second sidewall actuators 78. Provided on first and second inner side surfaces 60 which respectively face first and second channels 76 are a pair of electrical contacts 80-1, 80-2 which are formed by the demetallization of the upper side surface 62 of the active upper wall parts 60.

To electrically connect the sidewall actuator array 78, the electrical contacts 80-1, 80-2 which face each one of the ink-carrying channels 76 are electrically connected to individual leads of a drive system (not shown) capable of selectively applying a positive or negative voltage to the contacts 80-1, 80-2. When a positive voltage is applied to a contact 80-2 on one side of a selected sidewall actuator and a negative voltage is applied to a contact 80-1 on the other side of the selected sidewall actuator, an electric field E normal to the poling direction P is produced across the upper wall part of the selected sidewall actuator, thereby causing the sidewall actuator to deflect into the ink-carrying channel 76, thereby imparting a positive pressure pulse into a first ink-carrying channel 76*b* partially defined thereby and a negative pressure pulse into a second ink-carrying channel 76*a* partially defined thereby. By proper application of positive and/or negative pressure pulses to the ink-carrying channels 76, a droplet of ink may be ejected from a front end of the channels. It is further contemplated that, in one aspect of the invention, the contacts 80-1 and 80-2 which face a single ink-carrying channel 76 may be electrically connected to a single lead of the drive system. In this aspect, to drive both of the sidewall actuators 78 into a selected channel 76, a positive voltage would be applied to the electrical contact 80-1 and 80-2 facing the channel 76 while a negative voltage is applied to the electrical contacts 80-2, 80-1 on the opposite sides of the sidewall actuators 78 facing the selected channel 76.

As before, it should be clearly noted, however, that the number of channels 76 included in the sidewall actuator array 74 illustrated in FIG. 2F is purely exemplary and that it is fully contemplated that the sidewall actuator array 74 may include any number of channels. Furthermore, it is recommended that the outermost channel on each side of the sidewall actuator array 74, designated in FIG. 2G as channels 76*c* and 76*d*, respectively, should remain inactive. Finally, to complete assembly of an ink jet printhead from the illustrated sidewall actuator array 74, back ends 82 of the channels 76 should be closed and means (not shown) for supplying ink to the channels 76 should be provided.

Thus, there have been described and illustrated herein, various methods for manufacturing a sidewall actuator array for an ink jet printhead. Each of the disclosed methods provide a relatively simple and inexpensive method of manufacturing the aforementioned arrays which simplifies those methods taught by the prior art. Rather than requiring the precise deposition of conductive material at specific locations along an interior sidewall, the provision of a single metallization step between two material removal steps form the desired sidewall actuators without the need for a precise deposition step. However, those skilled in the art will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation on the scope of the invention.

What is claimed is:

1. A method of manufacturing a sidewall actuator array for an ink jet printhead, comprising the steps of:

providing a lower body portion having top and bottom side surfaces thereof and formed of an active piezoelectric material poled in a first direction generally orthogonal to said top and bottom side surfaces;

forming a series of generally parallel, longitudinally extending grooves which extend into said lower body portion a specified distance from said top side surface, said grooves defined by first interior side surfaces of said lower body portion exposed during said forming step;

depositing a layer of conductive material on said first interior side surfaces of said lower body portion;

deepening said grooves formed in said lower body portion to expose second interior side surfaces of said lower body portion;

providing an upper body portion having top and bottom side surfaces thereof and formed of an inactive piezoelectric material; and insulatively mounting said bottom side surface of said inactive upper body portion to said top side surface of said active lower body portion to form said sidewall actuator array.

2. A method of manufacturing a sidewall actuator array for an ink jet printhead according to claim 1 wherein the step of depositing a layer of conductive material on said interior side surfaces of said lower body portion further comprises the steps of:

depositing a layer of conductive material on said top and interior side surfaces of said upper wall parts; and removing a portion of said layer of conductive material which was deposited on said top side surfaces of said upper wall parts.

3. A method of manufacturing a sidewall actuator array for an ink jet printhead according to claim 1 wherein the step of deepening said grooves formed in said lower body portion exposes said second interior side surfaces of said lower body portion, such that facing pairs of said second interior side surfaces are spaced apart a distance no greater than the distance between corresponding facing pairs of said layers of conductive material.

4. A method of manufacturing a sidewall actuator array for an ink jet printhead, comprising the steps of:

providing a lower body portion having top and bottom side surfaces thereof and formed of an active piezoelectric material poled in a first direction generally orthogonal to said top and bottom side surfaces;

removing a first selected portion of said active lower body portion to form a series of generally parallel, longitudinally extending upper sidewall parts, each said upper sidewall part having first and second interior side surfaces;

depositing a layer of conductive material on said first and second interior side surfaces of each of said upper sidewall parts;

removing a second selected portion of said active lower body portion to form a series of generally parallel, longitudinally extending lower sidewall parts, each having first and second interior side surfaces and integrally formed with a corresponding one of said upper sidewall parts, each said lower sidewall part and said corresponding upper sidewall part integrally formed therewith defining a sidewall actuator for said sidewall actuator array;

providing an upper body portion having top and bottom side surfaces thereof and formed of an inactive piezoelectric material; and insulatively mounting said bottom side surface of said inactive upper body portion to said top side surfaces of said upper wall parts to form said sidewall actuator array.

5. A method of manufacturing a sidewall actuator array for an ink jet printhead according to claim 4 wherein the step of depositing a layer of conductive material on said interior side surfaces of said lower body portion further comprises the steps of:

depositing a layer of conductive material on said top and interior side surfaces of said upper wall parts; and removing a portion of said layer of conductive material which was deposited on said top side surfaces of said upper wall parts.

6. A method of manufacturing a sidewall actuator array for an ink jet printhead according to claim 4 wherein the step of removing a second selected portion of said active lower body portion forms said first and second interior side surfaces of said lower sidewall parts, such that facing pairs of said first and second interior side surfaces of said lower sidewall parts are spaced apart a distance no greater than the distance between corresponding facing pairs of said layers of conductive material.

7. A method of manufacturing a sidewall actuator array for an ink jet printhead comprising the steps of:

providing a lower body portion having a top side surface and formed of an active piezoelectric material poled in a first direction generally normal to said top side surface, a spacer portion having bottom and top side surfaces and formed of an insulative material, an intermediate body portion having bottom and top side surfaces and formed of an active piezoelectric material poled in a second direction generally normal to said bottom and top side surfaces and opposite to said first direction, and an upper body portion formed of an inactive material and having a bottom side surface;

mounting said bottom side surface of said insulative spacer portion to said top side surface of said active lower body portion;

mounting said bottom side surface of said active intermediate body portion to said top side surface of said insulative spacer portion;

removing a selected part of said active intermediate body portion, said insulative spacer portion and said active lower body portion to form a series of generally parallel, longitudinally extending sidewall actuators, each said sidewall actuator having an active lower wall part having first and second interior side surfaces, an inactive spacer part having first and second interior side surfaces and an active upper wall part having first and second interior side surfaces and a top side surface, each said sidewall actuator separated from an adjacent sidewall actuator by an interior side surface of said active lower body portion which is exposed during the removal of said selected part of said active lower body portion;

depositing a layer of conductive material on said top and interior side surfaces of said active wall part, said interior side surface of said insulative space part, said interior side surface of said active lower wall part and said interior side surface of said active base portion;

demetallizing said top side surface of said active upper wall part; and insulatively mounting said bottom side surface of said inactive upper body portion to said top side surfaces of said active upper wall parts to form said sidewall actuator array.

* * * * *